United States Patent
Shappir et al.

(10) Patent No.: US 10,740,476 B2
(45) Date of Patent: *Aug. 11, 2020

(54) TAMPER-PROOF STORAGE USING SIGNATURES BASED ON THRESHOLD VOLTAGE DISTRIBUTIONS

(71) Applicant: Apple Inc., Cupertino, CA (US)

(72) Inventors: Assaf Shappir, Ganey Tikva (IL); Itay Sagron, Gedera (IL)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,817

(22) Filed: Apr. 10, 2019

(65) Prior Publication Data
US 2019/0236288 A1   Aug. 1, 2019

Related U.S. Application Data

(63) Continuation of application No. 15/387,699, filed on Dec. 22, 2016, now Pat. No. 10,339,324.

(51) Int. Cl.
| | | |
|---|---|---|
| *G06F 21/60* | (2013.01) | |
| *G11C 11/56* | (2006.01) | |
| *G06F 21/86* | (2013.01) | |
| *G06F 21/75* | (2013.01) | |
| *G06F 21/62* | (2013.01) | |

(Continued)

(52) U.S. Cl.
CPC .......... *G06F 21/602* (2013.01); *G06F 21/60* (2013.01); *G06F 21/6245* (2013.01); *G06F 21/75* (2013.01); *G06F 21/79* (2013.01); *G06F 21/86* (2013.01); *G11C 7/24* (2013.01); *G11C 11/5635* (2013.01); *G11C 11/5642* (2013.01);

(Continued)

(58) Field of Classification Search
CPC .......... G06F 21/14; G06F 21/60; G06F 21/64; G06F 21/79; G06F 21/554; G06F 21/6245; G06F 21/82; G06F 21/55; G06F 21/755; G06F 21/556; G06F 21/7291; G06F 12/14; G06F 12/1425; G06F 12/1441

See application file for complete search history.

(56) References Cited

U.S. PATENT DOCUMENTS 5,644,636 A * 7/1997 Fernandez ............. G11C 16/22
                                                         711/163
5,661,800 A * 8/1997 Nakashima ............ G06F 21/10
                                                         705/57

(Continued)

*Primary Examiner* — Sher A Khan
(74) *Attorney, Agent, or Firm* — Kligler & Associates Patent Attorneys Ltd

(57) ABSTRACT

An apparatus includes an interface and storage circuitry. The interface is configured to communicate with a memory including multiple memory cells that store data as respective analog values. The memory is addressable using physical addresses. The storage circuitry is configured to perform a first read operation from a physical address, and determine a first sequence of analog values retrieved by the first read operation, to further perform a second read operation from the physical address, and determine a second sequence of analog values retrieved by the second read operation, to evaluate a variation between the first sequence and the second sequence, and to determine that an unauthorized re-programming to the physical address has occurred between the first read operation and the second read operation, in response to the evaluated variation exceeding a predefined variation level.

17 Claims, 3 Drawing Sheets

(51) Int. Cl.
*G06F 21/79* (2013.01)
*G11C 7/24* (2006.01)
*G11C 16/22* (2006.01)
*G11C 29/50* (2006.01)
*G11C 29/44* (2006.01)

(52) U.S. Cl.
CPC .............. *G11C 16/22* (2013.01); *G11C 29/50* (2013.01); *G11C 2029/4402* (2013.01); *G11C 2029/5002* (2013.01)

(56) References Cited

U.S. PATENT DOCUMENTS

| | | | | |
|---|---|---|---|---|
| 9,971,646 | B2* | 5/2018 | Teitel | G11C 29/52 |
| 2006/0268616 | A1* | 11/2006 | Knopf | G11C 11/4078 |
| | | | | 365/185.18 |
| 2007/0182421 | A1* | 8/2007 | Janke | G06F 21/77 |
| | | | | 324/522 |
| 2008/0133938 | A1* | 6/2008 | Kocher | G11B 20/00884 |
| | | | | 713/193 |
| 2008/0181001 | A1* | 7/2008 | Shalvi | G11C 16/26 |
| | | | | 365/185.03 |
| 2016/0033568 | A1* | 2/2016 | Tsao | G01R 31/2825 |
| | | | | 702/64 |
| 2016/0239365 | A1* | 8/2016 | Schweer | G06F 21/52 |
| 2016/0253272 | A1* | 9/2016 | Chinnakkonda Vidyapoornachary | G06F 12/1433 |
| | | | | 711/164 |
| 2016/0329084 | A1* | 11/2016 | Han | G11C 11/5621 |
| 2017/0083456 | A1* | 3/2017 | Zeng | G06F 9/45504 |
| 2017/0109527 | A1* | 4/2017 | Kim | G06F 21/556 |
| 2017/0337106 | A1* | 11/2017 | Yen | G11C 29/021 |
| 2018/0165198 | A1* | 6/2018 | Liu | G06F 12/0815 |

* cited by examiner

TAMPER-PROOF STORAGE USING SIGNATURES BASED ON THRESHOLD VOLTAGE DISTRIBUTIONS

TECHNICAL FIELD

Embodiments described herein relate generally to data storage, and particularly to methods and systems for detecting unauthorized access to a memory device.

BACKGROUND

In various computing devices and other systems, secret information known only to authorized users may be used for controlling access to the system. Methods for detecting and blocking unauthorized accessing attempts are known in the art. For example, U.S. Patent Application Publication 2006/0047955, whose disclosure is incorporated herein by reference, describes techniques related to protecting an application of a multi-application smart card against unauthorized manipulations. A system and method for guarding against unauthorized modifications includes partitioning the application into a plurality of basic blocks. For each basic block a check value is computed and remembered, wherein the check value is a function of data units of the basic block. During or prior to execution of the basic block, the check value is re-computed and verified to be the same as the remembered check value. If not, an error condition is indicated and a corrective action may be taken.

As another example, U.S. Pat. No. 7,996,911, whose disclosure is incorporated herein by reference, describes a memory card capable of preventing data leakage to a third party not having access authority, by imposing a limitation on the number of password authentications and automatically erasing the data. In a system comprised of a multimedia card and a host machine electrically connected to the multimedia card and controlling the operations of the multimedia card, a retry counter for storing the number of password authentication failures is provided, and the upper limit of the number of failures is registered in a register. When passwords are repeatedly entered once, twice, and up to n times, and the retry counter which counts the entries reaches the upper limit of the number of failures, the data is automatically erased so as not to leave the data in the flash memory.

SUMMARY

An embodiment that is described herein provides an apparatus including an interface and storage circuitry. The interface is configured to communicate with a memory including multiple memory cells that store data as respective analog values. The memory is addressable using physical addresses. The storage circuitry is configured to perform a first read operation from a physical address, and determine a first sequence of analog values retrieved by the first read operation, to further perform a second read operation from the physical address, and determine a second sequence of analog values retrieved by the second read operation, to evaluate a variation between the first sequence and the second sequence, and to determine that an unauthorized re-programming to the physical address has occurred between the first read operation and the second read operation, in response to the evaluated variation exceeding a predefined variation level.

In some embodiments, the storage circuitry is configured to generate a reference signature based on the first sequence, to generate a test signature based on the second sequence, and to evaluate the variation based on the reference signature and the test signature. In other embodiments, the storage circuitry is configured to perform the first read operation after performing an authorized programming operation to the physical address, and to perform the second read operation after performing the first read operation.

In an embodiment, the storage circuitry is configured to define multiple zones of the analog values, to classify the analog values of the first and second sequences into the zones, and to identify the unauthorized re-programming by detecting at least first and second analog values, which have a same position in the first and second sequences, respectively, but were classified into non-neighboring zones. In another embodiment, the storage circuitry is configured to define the zones by defining ranges of the analog values corresponding to at least a low-tail part and a high-tail part of a threshold voltage distribution of a predefined programming level of the memory cells. In yet another embodiment, the storage circuitry is configured to classify the first and second analog values into respective non-neighboring first and second zones, and to evaluate the variation based at least on a number of same positions shared by the first and second analog values.

In some embodiments, the storage circuitry is configured to retrieve from the physical address, in both the first read operation and the second read operation, a value of a retry counter that counts a number of attempts to access the memory. In other embodiments, the interface is configured to communicate with a first memory when the storage circuitry performs the first read operation, and to communicate with a second memory different from the first memory when the storage circuitry performs the second read operation, and the second memory mirrors data stored in the first memory at least in the physical address.

There is additionally provided, in accordance with an embodiment that is described herein, a method including, in a memory device, which includes multiple memory cells that store data as respective analog values, the memory is addressable using physical addresses, performing a first read operation from a physical address, and determining a first sequence of analog values retrieved by the first read operation. A second read operation from the physical address is performed, and a second sequence of analog values retrieved by the second read operation is determined. A variation between the first sequence and the second sequence is evaluated, and a determination that an unauthorized re-programming to the physical address has occurred between the first read operation and the second read operation is made, in response to the evaluated variation exceeding a predefined variation level.

These and other embodiments will be more fully understood from the following detailed description of the embodiments thereof, taken together with the drawings in which:

DETAILED DESCRIPTION OF EMBODIMENTS

Overview

Figure 1:
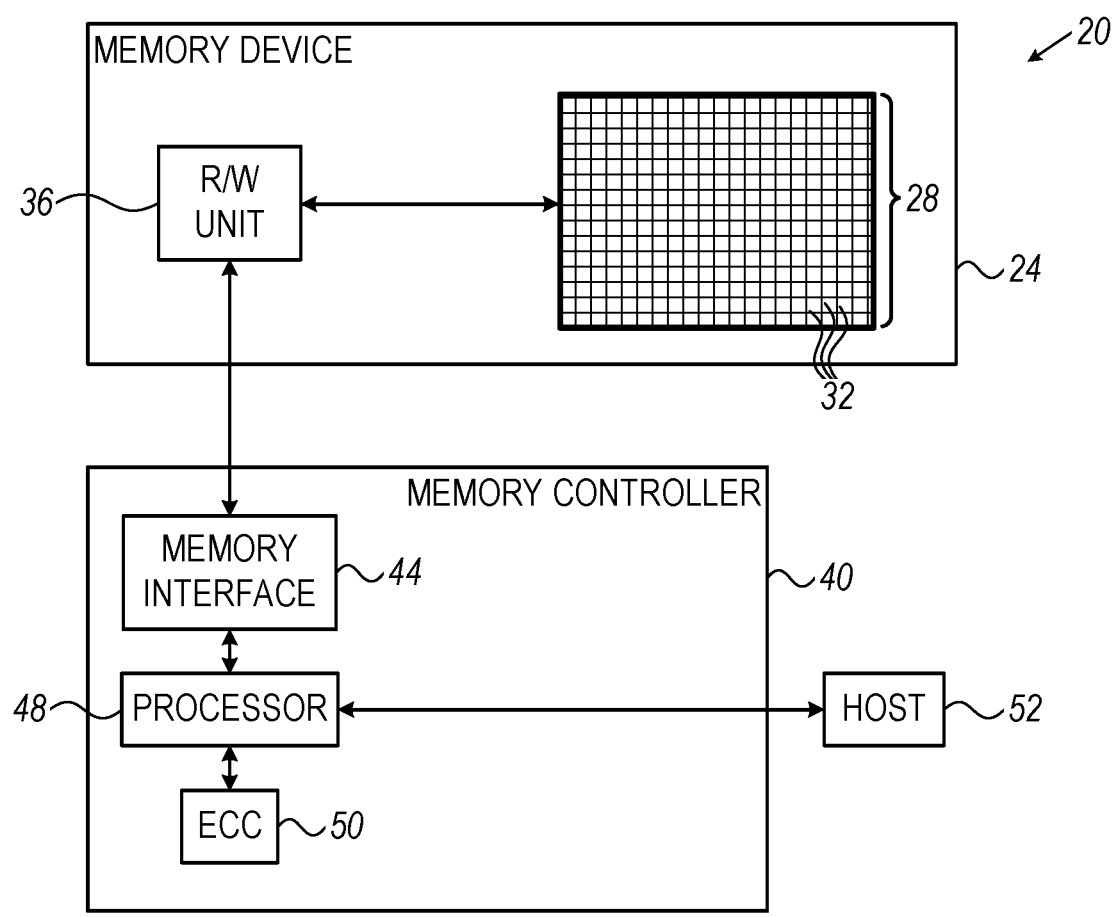
FIG. 1 is a block diagram that schematically illustrates a memory system protected against unauthorized programming, in accordance with an embodiment that is described herein.

Various systems are secured by controlling the access to vulnerable system resources such as storage. A system may store a password that is known only to selected users, and allow access to the system only when providing a matching password. In some applications, the system tracks failing attempts to enter a matching password and takes suitable action to maintain the system secured.

Hackers and Government authorities alike, seek methods to break systems security. For example, in an article published in arXiv:1609.04327v1, Sep. 14, 2016, Sergei Skorobogatov describes a successful mirroring attack on an electronic device, in which a password retry counter is re-programmed without being detected, thus allowing for unlimited password retry attempts.

Embodiments that are described herein provide improved methods and systems for detecting unauthorized attempts to access a memory device. In the disclosed techniques, a controller stores data as analog values in memory cells of a nonvolatile memory. The controller stores and retrieves data in groups of the memory cells by accessing respective physical addresses of the memory.

The disclosed techniques are based on the random nature of the sequential programming process carried out by the memory device hardware in programming analog values to nonvolatile memory cells. Information that captures one instance of the analog values cannot be easily regenerated in other instances because of the random component, and therefore can serve as a reference for detecting unauthorized programming.

In multi-level memory cells (e.g., MLC/TLC/QLC) randomness in the programming operation and the differences in programming speed are typically mitigated using an Incremental Step Pulse Programming (ISPP) scheme, in an attempt to narrow the threshold voltage distribution of the analog values, e.g., for achieving a low Bit Error Rate (BER). The actual location of a specific threshold voltage of a specific cell within the distribution typically changes in a random (or pseudo-random) manner from one write cycle to another, because of the programming process performed by the memory device hardware. By focusing on the tail parts of the distribution corresponding to higher randomness levels (i.e., are less likely to occur), unauthorized programming is discriminable from authorized programming, even when the threshold voltages drift due to retention, read disturb and other impairments.

Moreover, it has been observed experimentally that the analog value of a memory cell may vary within a larger range due to being re-programmed to the same programming level, than due to various impairments such as threshold voltage drifts, read disturb and the like. The larger variation in re-programming is caused, at least in part, by applying a sequence of programming pulses to push the memory cell to its desired programming level, and varying responsiveness of the memory cells to the programming pulses.

In some embodiments, the controller attempts to detect whether the memory cells relating to a given physical address were re-programmed in an unauthorized manner with the same data between successive read operations. The controller performs first and second read operations from the given physical address at different times, and determines respective first and second sequences of read analog values. The controller evaluates a variation between the first and second sequences of the analog values, and determines that an unauthorized re-programming to the given physical address has occurred between the first and second read operations, when the evaluated variation exceeds a predefined variation level.

In an embodiment, to estimate the variation, the controller defines multiple non-overlapping ranges or zones of the analog values. In one example, the controller defines at least a low-tail part and a high-tail part for one or more threshold voltage distributions associated with predefined programming levels of the memory. The controller evaluates the variation between the first and second sequences by separately classifying the analog values of the first sequence and second sequence into the zones.

The probability of a memory cell falling in far-apart zones in subsequent read operations is much higher when the memory cell was re-programmed between the read operations, compared to not being re-programmed. The controller therefore evaluates the variation by identifying common positions in the first and second sequences for which the analog values were classified into respective non-neighboring zones. In an embodiment, the controller evaluates the variation by counting at least some of the identified common positions.

Unlike conventional methods that use digital signatures for detecting tampering, in the disclosed embodiments the state of the memory cells is specified by the respective analog values stored in these memory cells. Because in repeated programming operations (carried out by the memory device hardware) the analog values of individual memory cells change in a random-like manner, it is impossible to predict and prevent large variations caused by re-programming. Therefore, the disclosed techniques provide protection against unauthorized programming attempts that is much more robust and hard to work-around than techniques that are based on digital signatures.

The disclosed techniques are suitable for use in a variety of applications. For example, the controller may store in the given physical address a value of a retry counter that counts the number of attempts to access the memory device. The disclosed techniques are applicable to both re-programming the same memory to which the data was initially stored, and to cases in which the data was mirrored to a different memory before being re-connected to the controller.

System Description

FIG. 1 is a block diagram that schematically illustrates a memory system 20 protected against unauthorized programming, in accordance with an embodiment that is described herein. System 20 can be used in various host systems and devices, such as in computing devices, cellular phones or other communication terminals, removable memory modules, Solid State Disks (SSD), Secure Digital (SD) cards, Multi-Media Cards (MMC) and embedded MMC (eMMC), digital cameras, music and other media players and/or any other system or device in which data is stored and retrieved.

System 20 comprises a memory device 24, which stores data in a memory cell array 28. The memory array comprises multiple memory cells 32, such as analog memory cells. In the context of the present patent application, the term "analog memory cell" is used to describe any memory cell that holds a continuous, analog value of a physical parameter, such as an electrical voltage or charge. Array 28 may comprise solid-state memory cells 32 of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM). Although the embodiments described herein refer mainly to analog memory, the disclosed techniques may also be used with various other memory types.

The charge levels stored in the cells and/or the analog voltages or currents written into and read out of the cells are referred to herein collectively as analog values, storage values or analog storage values. Although the embodiments described herein mainly address threshold voltages, the methods and systems described herein may be used with any other suitable kind of storage values.

Note that in the description that follows, the terms "analog values" and "threshold voltages" are used interchangeably.

System 20 stores data in analog memory cells 32 by programming the memory cells to assume respective memory states, which are also referred to as programming levels. The programming levels are selected from a finite set of possible levels, and each level corresponds to a certain nominal storage value. For example, a 2 bit/cell Multi-Level Cell (MLC) can be programmed to assume one of four possible programming levels by writing one of four possible nominal storage values into the cell. Similarly, a 3 bit/cell MLC, also referred to as a Triple-Level Cell (TLC), can be programmed to assume one of eight possible programming levels.

To program a group of memory cells to a given programming level, the R/W unit applies to the memory cells in the group a sequence of programming pulses that push the threshold voltages of these memory cells upward. In practice, different memory cells respond differently to the programming pulses, even when belonging to a common word line. Consequently, different memory cells may require a different number of programming pulses to reach the desired programming level. In addition, memory cells programmed with the same number of programming pulses may reach different actual threshold voltages. Moreover, a given memory cell typically reaches different threshold voltages in repeated programming operations to the same programming level.

Memory device 24 comprises a reading/writing (R/W) unit 36, which converts data for storage in the memory device to analog storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells into digital samples having an integer resolution of one or more bits. Data is typically written to and read from the memory cells in data units that are referred to as data pages (or simply pages, for brevity).

For reading a data page, the R/W unit typically sets one or more read thresholds, e.g., at about mid-points between adjacent nominal programming levels, and senses the threshold voltages of the memory cells relative to the read thresholds. The R/W unit can also read the analog values of the memory cells in selected ranges or zones by setting the read thresholds to zone boundaries.

The storage and retrieval of data in and out of memory device 24 is performed by a memory controller 40. Memory controller 40 comprises an interface 44 for communicating with memory device 24, a processor 48, and an Error Correcting Code (ECC) unit 50. The disclosed techniques can be carried out by memory controller 40, by R/W unit 36, or both. Thus, in the present context, memory controller 40 and R/W unit 36 are referred to collectively as storage circuitry that carries out the disclosed techniques.

Memory controller 40 communicates with a host 52, for accepting data for storage in the memory device and for outputting data retrieved from the memory device. In some embodiments, ECC unit 50 encodes the data for storage using a suitable ECC and decodes the ECC of data retrieved from the memory. ECC unit 50 may comprise any suitable type of ECC, such as, for example, Low Density Parity Check (LDPC), Reed-Solomon (RS) or Bose-Chaudhuri-Hocquenghem (BCH), can be used.

Memory controller 40 may be implemented in hardware, e.g., using one or more Application-Specific Integrated Circuits (ASICs) or Field-Programmable Gate Arrays (FPGAs). Alternatively, the memory controller may comprise a microprocessor that runs suitable software, or a combination of hardware and software elements.

The configuration of FIG. 1 is an example system configuration, which is shown purely for the sake of conceptual clarity. Any other suitable memory system configuration can also be used. For example, although the example of FIG. 1 shows a single memory device, in alternative embodiments memory controller 40 may control multiple memory devices 24, e.g., in a RAID storage system. Elements that are not necessary for understanding the principles of the present disclosure, such as various interfaces, addressing circuits, timing and sequencing circuits and debugging circuits, have been omitted from the figure for clarity.

In the example system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 40 can be implemented in software and carried out by a processor or other element of the host system. In some embodiments, host 52 and memory controller 40 may be fabricated on the same die, or on separate dies in the same device package.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In an example configuration of array 28, memory cells 32 are arranged in multiple rows and columns, and each memory cell comprises a floating-gate transistor. The gates of the transistors in each row are connected by word lines, and the sources of the transistors in each column are connected by bit lines. In the present context, the term "row" is used in the conventional sense to mean a group of memory cells that are fed by a common word line, and the term "column" means a group of memory cells fed by a common bit line. The terms "row" and "column" do not connote a certain physical orientation of the memory cells relative to the memory device. The memory array is typically divided into multiple memory pages, i.e., groups of memory cells that are programmed and read simultaneously.

In some embodiments, memory pages are sub-divided into sectors. Pages may be mapped to word lines in various manners. Each word line may store one or more pages. A given page may be stored in all the memory cells of a word line, or in a subset of the memory cells (e.g., the odd-order or even-order memory cells). To access a specific word line or page, the memory device is provided with a respective physical address.

Erasing of the memory cells in array 28 is usually carried out in blocks that contain multiple pages. Typical memory devices may comprise thousands of erasure blocks (also referred to as "memory blocks"). In a typical two-dimensional (2D) two-bit-per-cell MLC device, each erasure block is on the order of 128 word lines, each comprising several tens of thousands of cells. Two-bit-per-cell devices having 128 word lines per erasure block that store a data page per bit significance value would have 256 data pages per erasure block, and three-bit-per-cell devices would have 384 data pages per block. A typical three-dimensional (3D) device that stores three bits per cell may comprise, for example, 4 strings per block, wherein each string comprises 48 layers of cell columns. Such a 3D device has 12 pages per a physical word line, or 576 pages per an erasure block. Alternatively, other block sizes and configurations can also be used.

Variation of Analog Values Read from Memory Cells with and without Re-Programming In the disclosed techniques, the controller retrieves from a physical address in the memory, sequences of analog values corresponding to multiple memory cells accessed by the physical address. The controller evaluates a variation between two sequences of the analog values and determines that a programming operation was applied to the physical address between the read operations when the variation exceeds a predefined variation level.

Figure 2A:
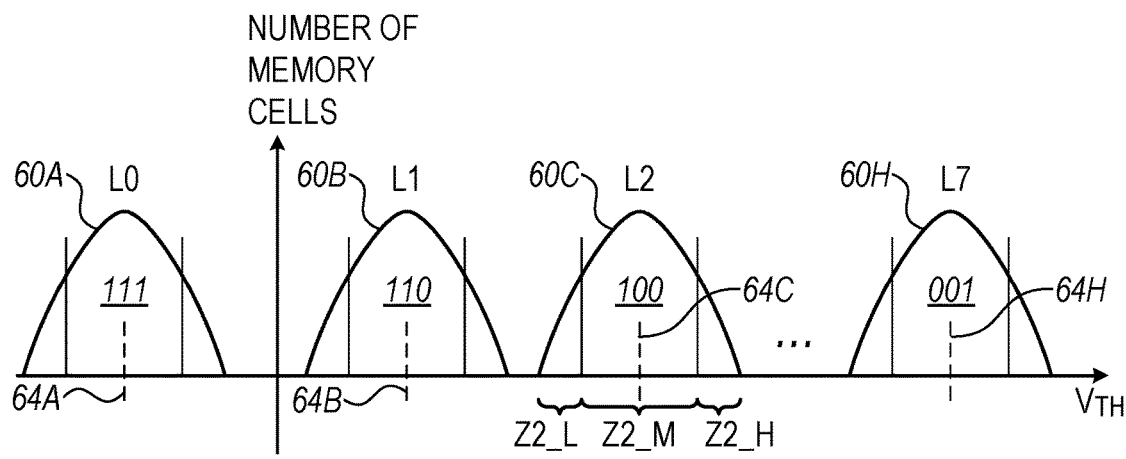
FIG. 2A is a diagram that schematically illustrates threshold voltage distributions of a group of memory cells, and selected zones of the threshold voltages, in accordance with an embodiment that is described herein.

FIG. 2A is a diagram that schematically illustrates threshold voltage distributions of a group of memory cells, and selected zones of the threshold voltages, in accordance with an embodiment that is described herein. The group of the memory cells may comprise, for example, one or more pages. The example of FIG. 2A refers to a TLC memory device having eight predefined programming levels denoted L0 . . . L7.

Each of programming levels L0 . . . L7 corresponds to a respective bit-triple of data being stored. In the example of FIG. 2A, the left bit in a bit-triple denotes a Least Significant Bit (LSB), the middle bit denotes a Central Significant Bit (CSB), and the right bit denotes a Most Significant Bit (MSB). For example, programming level L0, which in the present example is the erasure programming level, corresponds to data bits "111", and programming level L2 corresponds to data bits "100".

In FIG. 2A, the threshold voltages of the memory cells programmed to the different programming levels are distributed in accordance with respective threshold voltage distributions 60. Dotted lines 64 represent the nominal threshold voltages of the respective programming levels. As seen in the figure, at a given programming level, the threshold voltages of most of the memory cells are distributed close to the respective nominal threshold voltage, whereas a small number of memory cells fall at the distribution tails, i.e., well below or above the nominal threshold voltage.

In the context of the present application and in the claims, the term "low-tail part of a distribution" refers to a range of lowest threshold voltages of the distribution that contains a predefined percentage or fraction of the area under the entire distribution. Similarly, the term "high-tail part of a distribution" refers to a range of highest threshold voltages of the distribution that contains a predefined percentage of the area under the entire distribution.

In some disclosed embodiments, multiple non-overlapping zones are defined along the threshold voltage axis. In the example of FIG. 2A, three zones denoted Z2_L, Z2_M and Z2_H are defined for distribution 60C of programming level L2. Zones Z2_L and Z2_H cover a low-tail part and a high-tail part of the distribution, respectively, whereas zone Z2_M covers the middle part of the distribution. Similar zones can be defined for the other threshold voltage distributions. Note that in repeated read operations, a given memory cell may fall in in the same or different zones.

Although in the example of FIG. 2A, three zones are defined per distribution, this configuration is not mandatory and other suitable numbers of zones per distribution can also be used. Moreover, the zone configuration, e.g., the numbers and sizes of zones may differ among the different threshold voltage distributions.

Figure 2B:
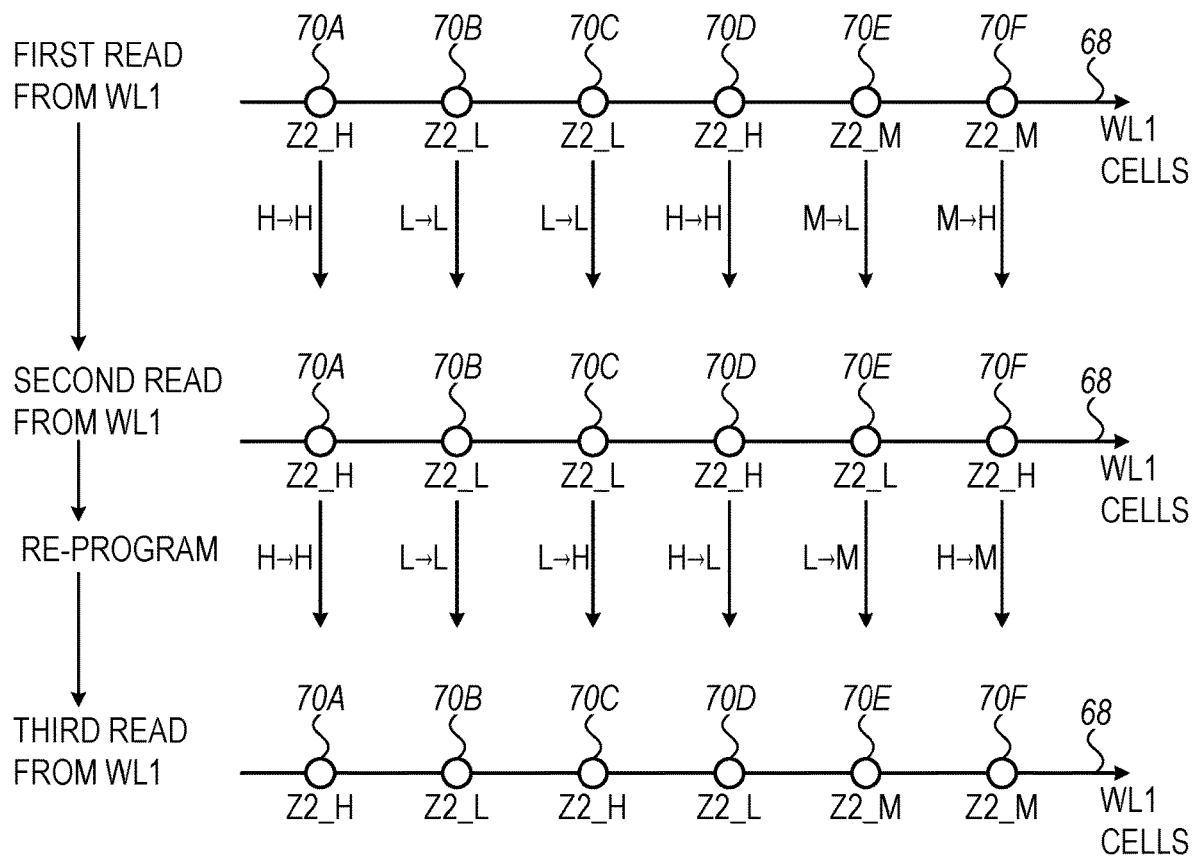
FIG. 2B is a diagram that schematically illustrates classification of memory cells to threshold voltage zones in three consecutive read operations, with and without re-programming between the read operations, in accordance with an embodiment that is described herein.

FIG. 2B is a diagram that schematically illustrates classification of memory cells to threshold voltage zones in three consecutive read operations, with and without re-programming between the read operations, in accordance with an embodiment that is described herein. FIG. 2B depicts a word line 68 (denoted WL1) comprising multiple memory cells 70 (selected among memory cells 32 of array 28,) which are programed to programming level L2. Word line 68 is depicted three times, corresponding to the three read operations, which are denoted FIRST READ, SECOND READ and THIRD READ, respectively.

Memory cells 70 are classified into the zones of distribution 60C of FIG. 2A, for each of the three read operations. Note that memory cells 70 are not re-programmed between the FIRST READ and SECOND READ operations, but are re-programmed to L2 between the SECOND READ and THIRD READ operations.

Each of memory cells 70 is classified into one of zones Z2_L, Z2_M and Z2_H of FIG. 2A, according to the actual threshold voltage of the memory cell. In the figure, the memory cells are depicted as circles, and the zones to which the memory cells belong appear below these circles. As seen in FIG. 2B, across multiple read operations, the threshold voltage of a given memory cell may fall in the same zone, in a neighboring zone or in a non-neighboring zone. Note that the probability of changing the threshold voltage to a non-neighboring zone is very low, especially in the threshold voltage distributions corresponding to the middle programming levels (e.g., levels 3 . . . 5 out of the eight levels) and when taking suitable measures for compensating for various impairments such as retention, read disturb, programming disturb and the like.

The threshold voltages of memory cells when not being re-programed between successive read operations may change due to various impairments such as read disturb, programming disturb and retention, and/or due to variations in the operating conditions, such as varying temperature or the voltage of the power source. Such impairments typically result in the memory cell falling in the same or neighboring zone in multiple read operations.

For example, the threshold voltages of memory cells 70A, 70B, 70C and 70D fall in the same zones Z2_H or Z2_L in both the FIRST READ and SECOND READ operations. As another example, the threshold voltages of memory cells 70E and 70F fall in zone Z2_M in the FIRST READ operation, and in a neighboring zone Z2_L or Z2_H, in the SECOND READ operation.

In the present example we assume that memory cells 70 were re-programed to L2 between the SECOND READ and THIRD READ operations. After being re-programmed, a memory cell belonging to zone Z2_L (or Z2_H) in the SECOND READ operation may fall in a non-neighboring zone Z2_H (or Z2_L) in the THIRD READ operation. For example, memory cell 70C falls in zone Z2_L in the SECOND READ operation and in zone Z2_H in the THIRD READ operation. Similarly, memory cell 70D changes from zone Z2_H in the SECOND READ operation to Z2_L in the THIRD READ operation because of the in-between re-programming.

Experiments indicate that the probability of a given memory cell falling in non-neighboring zones (such as, for example, Z2_L and Z2_H in FIG. 2A) in successive read operations is much higher when the memory cells are re-programmed between the read operations compared to not being re-programmed. This observation is used in defining a signature that specifies the state of memory cells based on their classification to the threshold voltage zones. By comparing between the signatures in successive read operations, it is possible to identify whether the memory cells were re-programmed (e.g., by an unauthorized programming operation) between the read operations. Example signatures and comparison methods are described further below.

Detecting Unauthorized Re-Programming

Figure 3:
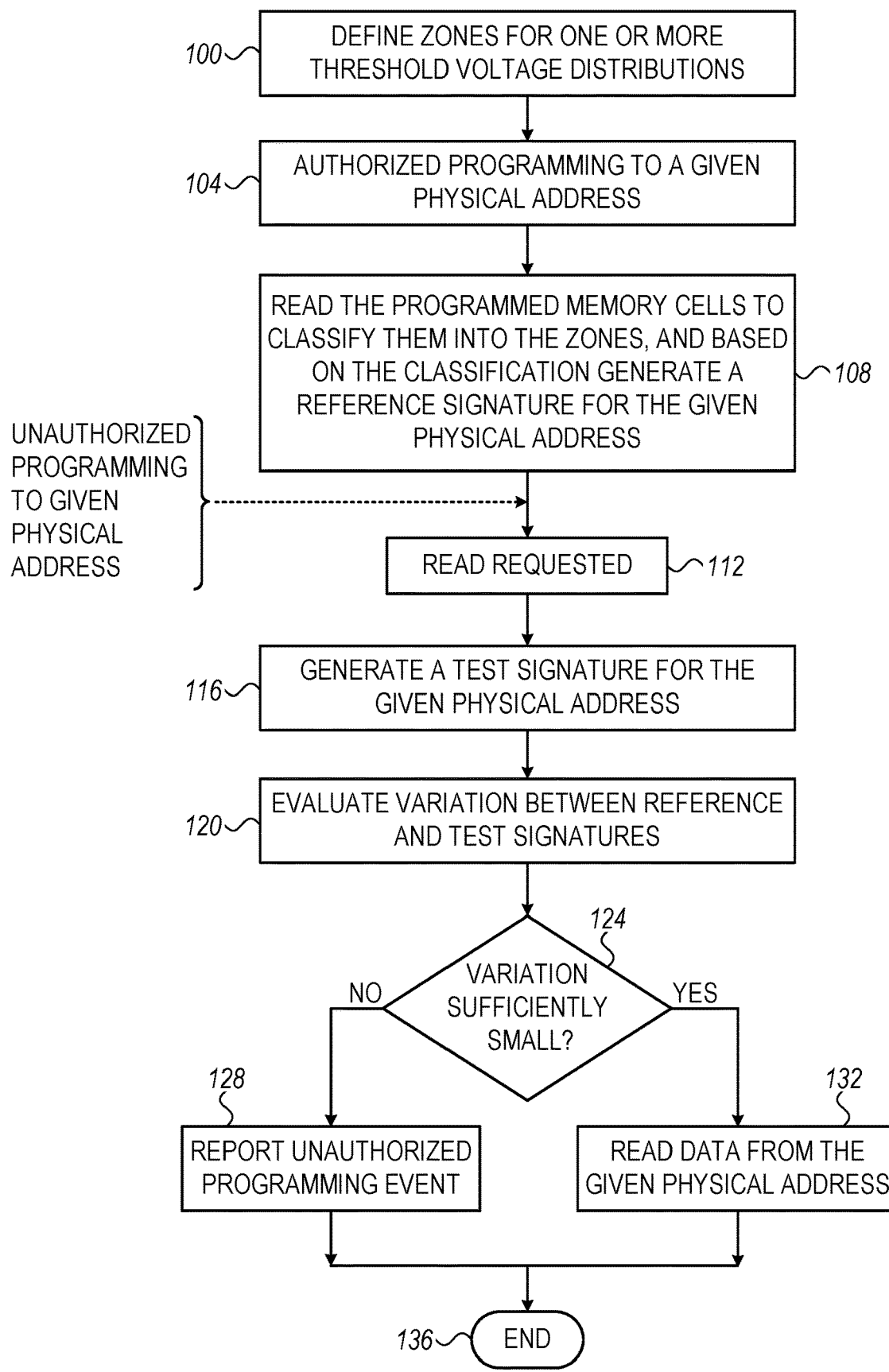
FIG. 3 is a flow chart that schematically illustrates a method for detecting unauthorized programming to a physical address of a memory, based on classifying memory cells to threshold voltage zones, in accordance with an embodiment that is described herein.

FIG. 3 is a flow chart that schematically illustrates a method for detecting unauthorized programming to a physical address of a memory, based on classifying memory cells to threshold voltage zones, in accordance with an embodiment that is described herein. The method is described as being executed by memory controller 40, in memory system 20 in which memory device 24 comprises a TLC device.

The method begins with memory controller 40 defining threshold voltage zones, at a zone definition step 100. For the TLC device, the controller defines multiple zones for each of one or more of the eight threshold voltage distributions. In the present example, the controller defines for each of the eight distributions a low zone and a high zone, corresponding to the distribution low-tail part and high-tail part (similarly to Z2_L and Z2_H in FIG. 2A). Each of the low and high zones corresponds to a percentage of about 25% of the memory cells programmed to the respective programming level.

In alternative embodiments, the controller may define zones for only a subset of the eight distributions, define three or more zones for at least one distribution, or use any other suitable zone configuration.

At an authorized programming step 104, the memory controller programs a data page to a given physical address of the memory device. In an embodiment, the data page programmed may be scrambled, encrypted, or both, using any suitable scrambling and encryption methods with suitable keys. In other embodiments, the controller may program multiple data pages in multiple respective physical addresses.

At a reference signature generation step 108, the memory controller reads a reference sequence of threshold voltages from the given physical address, classifies the retrieved reference sequence of threshold voltages to the zones defined at step 100, and based on the classification generates a reference signature for the physical address. The memory controller stores the reference signature in memory device 24.

The memory controller may generate the reference signature in various ways. For example, in some embodiments, the signature specifies the positions in the reference sequence for which the threshold voltages belong to the zones defined at step 100, along with the respective zones identities. In other embodiments, the signature comprises the entire reference sequence of the threshold voltages retrieved, wherein positions for which the threshold voltages do not belong to any of the zones defined at step 100 are marked accordingly. In other embodiments, the signature data may be compressed using suitable lossless or lossy methods for data compression that maintain signature data integrity while minimizing its size.

The signature data may be stored as non-volatile data on the same memory device, in a physical address different from the physical address from which the signature was derived or on a different memory device. The signature data may be scrambled and/or encrypted using any suitable private key scheme, to prevent an unauthorized user that has knowledge of the exact zone classification method being used, from tampering with the stored signature data, directly.

By updating the reference signature in response to an authorized programming operation, the reference signature corresponds to the most recently authorized programming operation to the given physical address.

At a read requesting step 112, the controller receives an authorized request to read data from the given physical address, and proceeds to a test signature generation step 116. At step 116, the controller reads a test sequence of threshold voltages from the given physical address, and based on the test sequence generates a test signature for the given physical address, using the same zone configuration and signature generation scheme that were used for generating the reference signature at step 108.

At a variation evaluation step 120, the memory controller evaluates a variation between the test and reference signatures for detecting whether an unauthorized programming has occurred. The memory controller may evaluate the variation in various ways. For example, in some embodiments, the memory controller counts the number of common positions in the reference and test sequences for which the threshold voltages belong to non-neighboring respective zones. The controller determines that re-programming to the given physical address has occurred when this count exceeds a predefined threshold count.

In an example embodiment, the controller derives a first count based on common positions in the test and reference sequences for which the threshold voltages belong to a low zone in the reference signature and to a high zone in the test signature. The high and low zones correspond to a high-tail part and low-tail part of the relevant threshold voltage distributions. The controller may additionally derive a second count based on common positions in the test and reference sequences for which the threshold voltages belong to the high zone in the reference signature and to the low zone in the test signature. The memory controller may use the first count, second count, or a weighted sum of the first count and second count for comparison with the threshold count.

In some embodiments, to improve the decision accuracy, the controller may derive the signature based on multiple threshold voltage distributions, e.g., using the methods described above.

At a decision step 124, the controller checks whether an unauthorized programming operation has occurred based on the variation evaluated between the test and reference signatures. For example, a count value above the threshold count at step 120 indicates that an unauthorized programming has occurred, and the memory controller reports this event at a reporting step 128. Otherwise, no unauthorized programming has occurred, and the memory controller reads the memory cells of the given physical address at an authorized reading step 132.

Following step 128 or 132, the memory controller loops back to step 136 and the method terminates.

The method of FIG. 3 can be applied in various applications. In an example embodiment, the data stored in the given physical address comprises a password retry counter. Using this method, the controller can detect unauthorized programming to the retry counter, indicating possible tampering, and respond accordingly, e.g., by blocking access to the memory device.

The embodiments described above are given by way of example, and other suitable embodiments can also be used. For example, although we mainly refer to generating signatures for a given physical address, the memory controller may similarly generate the signatures based on multiple read sequences from multiple physical addresses within the same or different block.

In the embodiments described above, authorized programming may involve storing an updated version of the data (e.g., an updated password retry count) in a different block, and re-generating the signature, accordingly. Authorized programming may additionally refer to copying data from one block to another, e.g., as a result of garbage collection, which also requires re-generating the signature.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an interface, configured to communicate with a memory comprising multiple memory cells that store data as respective analog values, wherein the memory is addressable using physical addresses; and
   storage circuitry, which is configured with voltage level distributions and corresponding bit values, and configured to:
      perform a first read operation to read first threshold voltages from a physical address, and determine a reference signature based on locations of the read first threshold voltages in the voltage distributions in which the first threshold voltages are located;
      perform a second read operation to read second threshold voltages from the physical address, convert the read second threshold voltages into respective one or more digital bits and determine a test signature based on locations of the read second threshold voltages in the voltage distributions corresponding to the respective one or more digital bits;
      evaluate a variation between the reference signature and the test signature; and
      determine that an unauthorized re-programming to the physical address has occurred between the first read operation and the second read operation, in response to the evaluated variation exceeding a predefined variation level.

2. The apparatus according to claim 1, wherein the storage circuitry is configured to perform the first read operation after performing an authorized programming operation to the physical address, and to perform the second read operation after performing the first read operation.

3. The apparatus according to claim 1, wherein the storage circuitry is configured to define multiple zones in the voltage distributions, to classify the first threshold voltages and the second threshold voltages into the zones, and to identify the unauthorized re-programming by detecting first and second threshold voltages, read from a same memory position classified into non-neighboring zones.

4. The apparatus according to claim 3, wherein the storage circuitry is configured to define the zones by defining ranges of the analog values corresponding to at least a low-tail part and a high-tail part of the voltage distributions of the memory cells.

5. The apparatus according to claim 3, wherein the storage circuitry is configured to evaluate the variation based at least on a number of memory positions for which the first and second threshold voltages are in different zones.

6. The apparatus according to claim 1, wherein the storage circuitry is configured to retrieve from the physical address, in both the first read operation and the second read operation, a value of a retry counter that counts a number of attempts to access the memory.

7. The apparatus according to claim 1, wherein the interface is configured to communicate with a first memory when the storage circuitry performs the first read operation, and to communicate with a second memory different from the first memory when the storage circuitry performs the second read operation, wherein the second memory mirrors data stored in the first memory at least in the physical address.

8. A method, comprising:
   in a memory device, which comprises multiple memory cells that store data as respective analog values, the having defined voltage level distributions and corresponding bit values, wherein the memory is addressable using physical addresses, performing a first read operation to read first threshold voltages from a physical address, and determining a reference signature based on locations of the read first threshold voltages in the voltage distributions in which the first threshold voltages are located, and further performing a second read operation to read second threshold voltages from the physical address, converting the read second threshold voltages into respective one or more digital bits and determining a test signature based on locations of the read second threshold voltages in the voltage distributions corresponding to the respective one or more digital bits;

evaluating a variation between the reference signature and the test signature; and determining that an unauthorized re-programming to the physical address has occurred between the first read operation and the second read operation, in response to the evaluated variation exceeding a predefined variation level.

9. The method according to claim 8, wherein performing the first read operation comprises performing the first read operation after performing an authorized programming operation to the physical address, and wherein performing the second read operation comprises performing the second read after performing the first read operation.

10. The method according to claim 8, and comprising defining multiple zones in the voltage distributions, and classifying the first threshold voltages and the second threshold voltages into the zones, and wherein identifying the unauthorized re-programming comprises detecting first and second threshold voltages, read from a same memory position classified into non-neighboring zones.

11. The method according to claim 10, wherein defining the zones comprises defining ranges of the analog values corresponding to at least a low-tail part and a high-tail part of the voltage distributions of the memory cells.

12. The method according to claim 10, wherein evaluating the variation comprises evaluating the variation based at least on a number of memory positions for which the first and second threshold voltages are in different zones.

13. The method according to claim 8, and comprising retrieving from the physical address, in both the first read operation and the second read operation, a value of a retry counter that counts a number of attempts to access the memory.

14. The method according to claim 8, wherein performing the first read operation comprises performing the first read operation from a first memory, and wherein performing the second read operation comprises performing the second read operation from a second different memory that mirrors data stored in the first memory at least in the physical address.

15. A method, comprising:

in a memory device, which comprises multiple memory cells that store data as respective analog values, wherein the memory is addressable using physical addresses, performing a first read operation from a physical address, and determining first analog values retrieved by the first read operation, and further performing a second read operation from the physical address, and determining second analog values retrieved by the second read operation;

evaluating a variation between the first analog values and the second analog values;

determining that an unauthorized re-programming to the physical address has occurred between the first read operation and the second read operation, in response to the evaluated variation exceeding a predefined variation level; and defining multiple zones of the analog values, and classifying a first sequence of the first analog values and a second sequence of the second analog values into the zones, and wherein identifying the unauthorized re-programming comprises detecting at least a first analog value and a second analog values, which have a same position in the first and second sequences, respectively, but were classified into non-neighboring zones.

16. The method according to claim 15, wherein defining the zones comprises defining ranges of the analog values corresponding to at least a low-tail part and a high-tail part of a threshold voltage distribution of a predefined programming level of the memory cells.

17. The method according to claim 15, wherein classifying the first and second analog values comprises classifying the first analog values and the second analog values into respective non-neighboring first and second zones, and wherein evaluating the variation comprises evaluating the variation based at least on a number of same positions in the first and second sequences that are shared by the classified first and second analog values.

\* \* \* \* \*